US008949296B2

(12) United States Patent
Katayama et al.

(10) Patent No.: US 8,949,296 B2
(45) Date of Patent: Feb. 3, 2015

(54) METHOD FOR CONTROLLING FILE REQUEST ACCESS

(71) Applicant: International Business Machines Corporation, Armonk, NY (US)

(72) Inventors: Yasunao Katayama, Kanagawa (JP); Nobuyuki Ohba, Miyagi (JP); Kohji Takano, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 13/686,237

(22) Filed: Nov. 27, 2012

(65) Prior Publication Data

US 2013/0159363 A1 Jun. 20, 2013

(30) Foreign Application Priority Data

Nov. 28, 2011 (JP) ................. 2011-259178

(51) Int. Cl.
*G06F 17/30* (2006.01)
(52) U.S. Cl.
CPC .............................. *G06F 17/30132* (2013.01)
USPC ....................................................... 707/822
(58) Field of Classification Search
CPC .............................. G06F 17/30132
See application file for complete search history.

(56) References Cited

U.S. PATENT DOCUMENTS

| 7,702,821 | B2 | 4/2010 | Feinberg et al. | |
|---|---|---|---|---|
| 2004/0205301 | A1* | 10/2004 | Hara et al. | 711/137 |
| 2007/0039056 | A1* | 2/2007 | Rector et al. | 726/26 |
| 2008/0126578 | A1* | 5/2008 | Krithivas | 710/4 |
| 2012/0179783 | A1* | 7/2012 | Chung | 709/217 |
| 2013/0031297 | A1* | 1/2013 | Benhase et al. | 711/103 |

\* cited by examiner

*Primary Examiner* — Khanh Pham
(74) *Attorney, Agent, or Firm* — Scully, Scott, Murphy & Presser, P.C.; Gail H. Zarick, Esq.

(57) ABSTRACT

A mirror file number corresponding to a file being requested is transmitted to a host OS. A determination is made as to whether or not caching is performed in the host OS, and reading of the data of the mirror file number is requested to a block device if it is determined that the data of the mirror file number that was transmitted is not cached. The block device acquires the memory address where the corresponding actual contents are stored, corresponding to the sector number, acquires the sequence number corresponding to the contents, changes the acquired sequence number, and reads the data of the acquired memory address. The read data is converted to data with a modified sequence number attached, and the data is provided to the host OS. If it is determined that the data is cached in the host OS, the cached data is provided.

12 Claims, 6 Drawing Sheets

FIG. 1

Overall Configuration

| Address | Memory region file data |
|---|---|
| 0x00000000 ⋮ 0x001FFFFF | ContentA |
| 0x00200000 ⋮ 0x002FFFFF | ContentB |

FIG. 6A

| FS emulator sector | Corresponding mirror file name | Address | Corresponding file data name | SN |
|---|---|---|---|---|
| 0x00400000 | ContentA#0 | 0x00000000 | ContentA | 2 |
| 0x00401000 | ContentA#1 | 0x00000000 | ContentA | 0 |
| 0x00402000 | ContentA#2 | 0x00000000 | ContentA | 0 |
| ⋮ | ⋮ | ⋮ | ⋮ | ⋮ |
| 0x0043F000 | ContentA#63 | 0x00000000 | ContentA | 0 |
| 0x00440000 | ContentB#0 | 0x00200000 | ContentA | 2 |
| 0x00441000 | ContentB#1 | 0x00200000 | ContentA | 1 |
| 0x00442000 | ContentB#2 | 0x00200000 | ContentA | 1 |
| ⋮ | ⋮ | ⋮ | ⋮ | ⋮ |
| 0x0047F000 | ContentB#63 | 0x00200000 | ContentA | 0 |

Construction of mirror file entry table
(MFET) with file system emulator 36

FIG. 6B

METHOD FOR CONTROLLING FILE REQUEST ACCESS

TECHNICAL FIELD

The present invention relates to a method for effectively controlling file request access across devices with different processing performance.

RELATED TECHNOLOGY

High-speed download using millimeter-wave technologies has been achieved, and scenarios for use in slate devices and mobile terminals are being investigated. The speed of millimeter wave link is overwhelmingly fast compared to the external interface of terminals, and therefore even though a millimeter wave link are directly connected to the external interface of conventional slate devices and mobile terminals, the speed of a millimeter wave link cannot be fully utilized.

Millimeter wave products are in the early stages of proliferation, but in order to be used as a communication device for slate devices and mobile terminals, preferably there will not need to use new components, such as special device drivers and high-speed external interfaces If there is a millimeter-wave device that are externally attached through an interface that is currently in standard use, and similarly, if operation is possible using the device drivers and the like that are currently present in the terminal, new technologies such as millimeter wave can easily be introduced to the terminal.

Therefore, an external memory device that integrates a millimeter-wave receiver and a memory is conceivable as an optimum configuration in light of the foregoing.

A wireless receiver (Rx) exists on the external memory device side, such that control of the wireless receiver (Rx) is performed from the terminal, and the downloaded contents are directly written to a memory inside the device. The downloaded contents that have been written to the memory are read by the user terminal when needed.

Access to the external memory device is performed by the standard file interface of the OS, and when reading the downloaded contents, control of the wireless receiver (Rx) is similarly performed by a standard file interface.

However, control of this type of external memory device and management of the received contents have the following technological challenges.

OS caching problem: The data of the external memory device may be cached by the file system of OS. Therefore even if new data arrives to the external memory device side, the OS side will not detect the new data because of the file system cache.

The register read/write operations receiver are cached and proper register operation is not possible on the receiver hardware.

If the cache is used, high-speed operations are possible by prefetch, but for the case of dynamically changing contents, there is a possibility of data inconsistency because prefetch is independently performed.

On the other hand, if cache is not used, the access speed is decreased because real access to the memory hardware will be performed each time.

Patent document 1 discloses technology where a Wi-Fi receiver is integrated in an SD card, and the SD card data is replicated in storage on the cloud or other Wi-Fi enabled devices, and therefore the SD card appears to have infinite capacity.

However, the device dealt with patent document 1 transfers data from the SD card to the external system, and thus the direction of the data flow is completely opposite to the technology addressed by the present invention.

The flow of data is completely opposite, but the present invention attempts to resolve these problems (Standard input and output does not have means for notifying the OS when caching is performed by the OS but the contents are changed on the SD side.)

PRIOR ART DOCUMENTS

Patent Documents

Patent document 1
U.S. Pat. No. 7,702,821 B2

SUMMARY OF THE INVENTION

Problem to be Resolved by the Invention

For an external memory device where the receiver is built-in and the receiver writes the received data directly to a memory region, a method that controls the receiver and enables downloading by resolving the OS caching problem.

Means for Resolving Problems

A mirror file number corresponding to a file being requested is transmitted to the host OS.

A determination is made as to whether or not caching is performed in the host OS, and reading of the data of the mirror file number is requested to a block device if it is determined that the data of the mirror file number that was transmitted is not cached.

The block device acquires the memory address where the corresponding actual contents are stored, corresponding to the sector number, acquires the sequence number corresponding to the contents, changes the acquired sequence number, and reads the data of the acquired memory address. The data that was read is converted to data with a modified sequence number attached, and the data is provided to the host OS.

If it is determined that the data is cached in the host OS, the data that is cached in the host OS is provided.

Effect of the Invention

The following problem with caching by OS can be resolved. (The data of the external memory device may be cached by the OS file system. Therefore even if new data arrives to the external memory device side, the OS side will not detect the new data because of the file system cache.)

DETAILED DESCRIPTION OF THE PREFERRED EMBODIMENTS

Figure 1:
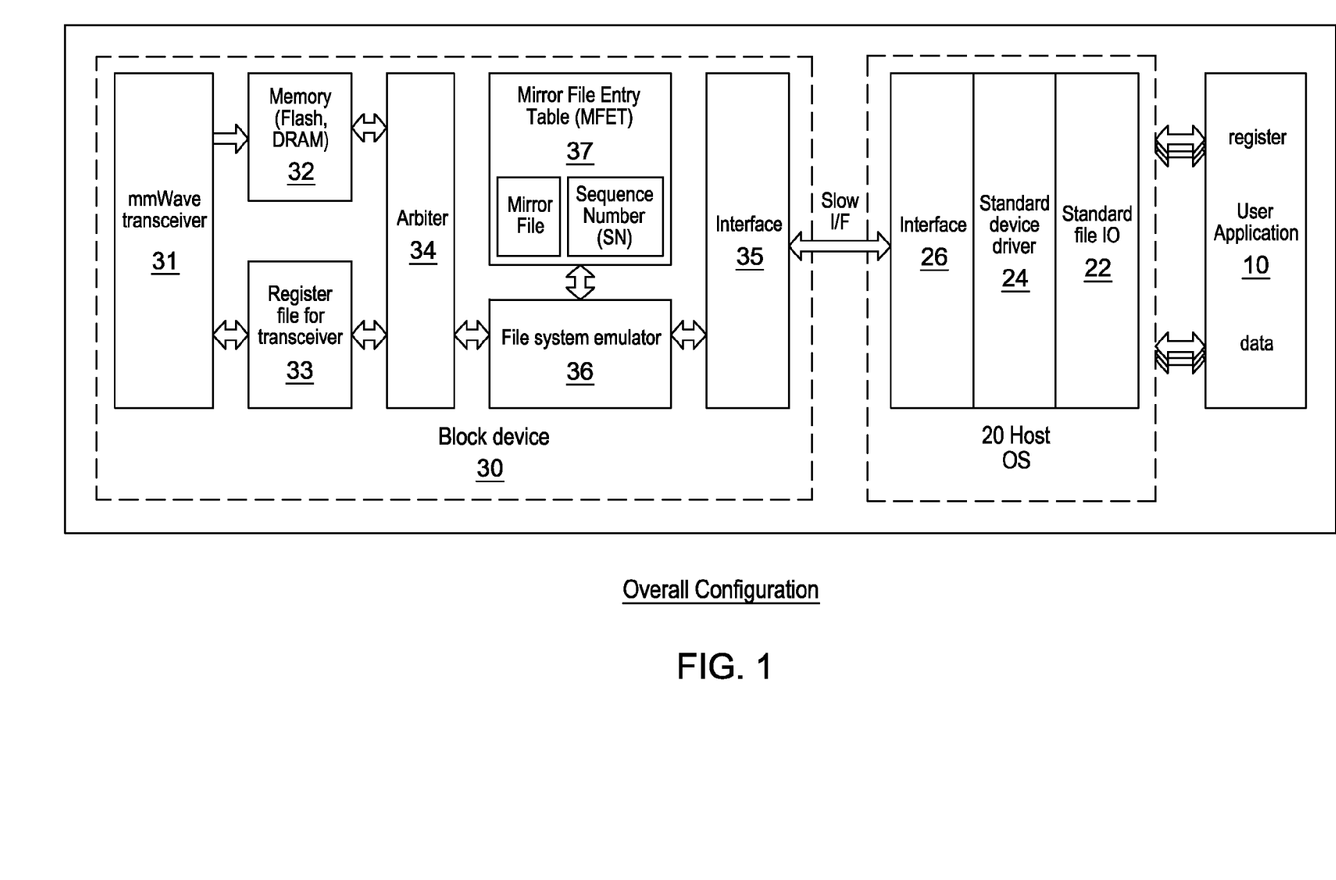
FIG. 1 illustrates the overall configuration of a system that controls file request access according to the present invention.

FIG. 1 illustrates the overall configuration of a system that controls file request access according to the present invention.

The user application 10, host OS (host system) 20, and block device 30 are shown in a connected relationship.

The block device 30 contains a wireless receiver (mmWave receiver) 31, and the received contents are directly stored in memory (flash, DRAM, and the like) 32.

Broadband wireless communication such as a millimeter wave link or the like is extremely fast, and if for example the host OS side is a terminal that only has a low speed interface (I/F) as the interface for external devices such as mobile terminals and tablet terminals, the transfer speed will be restricted by the low-speed I/F, and the broadband of the wireless side cannot be fully utilized.

The contents received by the wireless receiver 31 are directly stored in the memory 32 in the block device 30. A register for controlling the hardware of the wireless receiver 31 (register file for receiver) 33 is also provided in the block device 30.

Access to the memory 32 and register 33 is controlled by an arbitration circuit (arbiter) 34, and controls data operations from the host OS 20 and the data operations from the wireless receiver.

Access from the host OS 20 is normally initiated by the user application 10 that runs on the host OS.

If the user application 10 is to control the memory 32 in the block device 30 and the wireless receiver 31 in the block device 30 using the register 33, the operation is performed using a standard file 10 (standard file 10) 22 that is provided as standard in the host OS 20.

Specifically, the operation is the same as a normal file that is controlled by the host OS 20, wherein a file is opened, and reading/writing of the file is accessed by the block device 30 via a physical interface 26, after passing through a standard device driver 24 via the standard API of the OS.

Access for reading/writing that was requested via the interface 26 is transferred into the block device through the interface 35 of the block device.

With the characteristic configuration of the present invention, the requested access is interpreted by a file system emulator 36, which file to be accessed in the block device 30 is detected from the sector value (number) of the file that was accessed, and a determination is made as to whether or not the file is the mirror file described below, and if it is the mirror file, the sequence number is changed.

If the access from the host OS 20 is for reading (data is sent from the block device to the host device), a sequence number is added to the end of the response data.

The data with the sequence number attached is returned to the user application 10 via the host OS 20, and the user application 10 refers to the sequence number that was received and determines whether or not the data that was received is actually the data that was returned from the block device. The details are described below.

Figure 2:
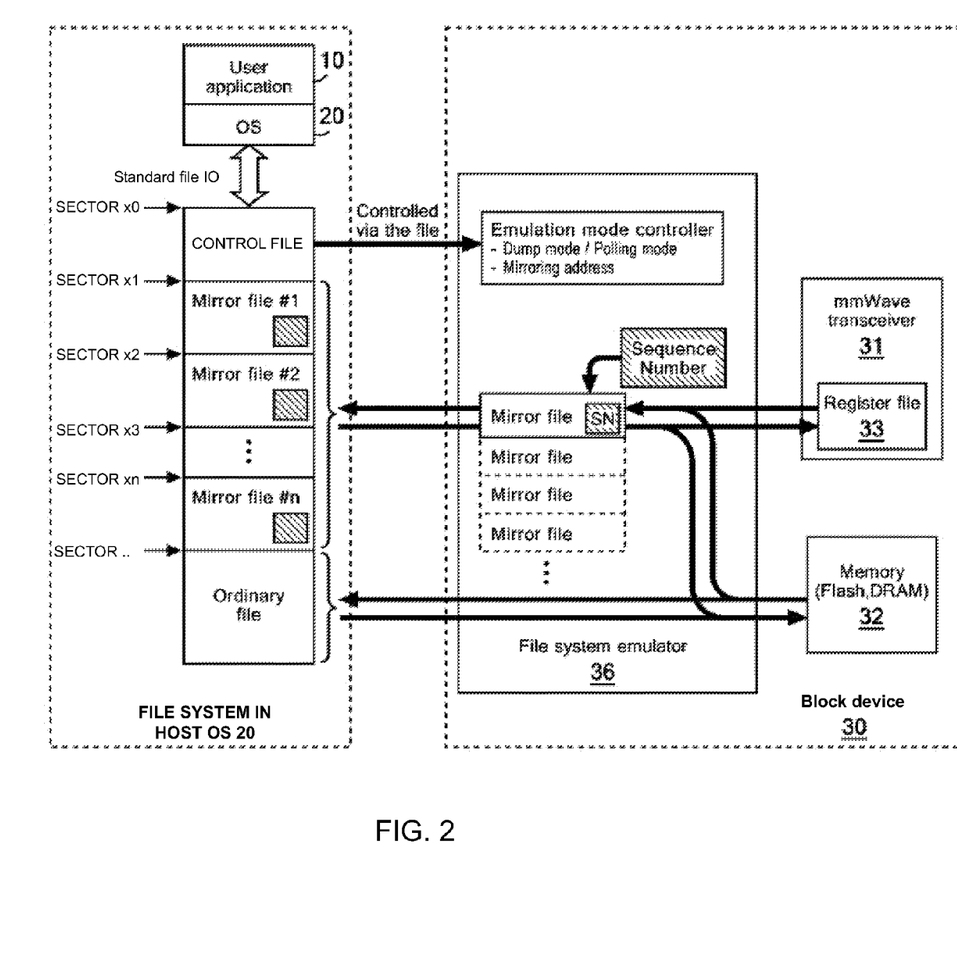
FIG. 2 illustrates the data flow according to the present invention.

FIG. 2 illustrates the data flow according to the present invention.

When the user application 10 performs file access via the standard file I/O 22, the sector that is storing the file subject to access is investigated by the (host) OS 20, and an access request for that sector is sent to the block device 30.

With a normal block device, the address of the memory 32 in the block device is directly calculated from the sector, and the memory of that address is accessed.

With the configuration of the present invention, the sector value is first interpreted by a file system emulator 36 in the block device 30 two distinguished whether the sector is a sector that can be directly accessed to memory 32 similar to a normal block device, or is for a mirror file.

Herein, a "mirror file" is referred to as a different file on the file system in the OS 20, but the actual memory in the block device 30 for that file is in the same location.

In FIG. 2, Mirror file #1 and Mirror file #n are all mirror files on the file system referenced from the OS 20, and although the mirror files are treated as physically different file by the OS 20, the data in the memory of the block device 30 references data of the same address.

With the configuration of the present invention, the memory in the block device can be a register group for controlling a wireless receiver (register file for receiver) 33, before referencing the mirror file.

Furthermore, with the present invention, a number that is changed (typically added) each time an access for that file is generated in the block device 30, also referred to as a sequence number (SN), is added to the end of the data for the mirror file.

Figure 3A:
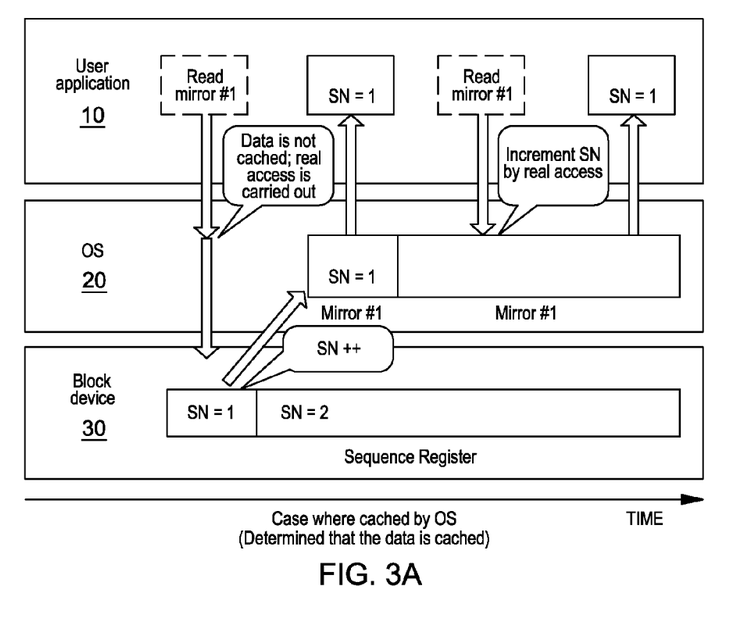
FIG. 3 illustrates in further detail the function of the sequence number (SN).
Figure 3B:
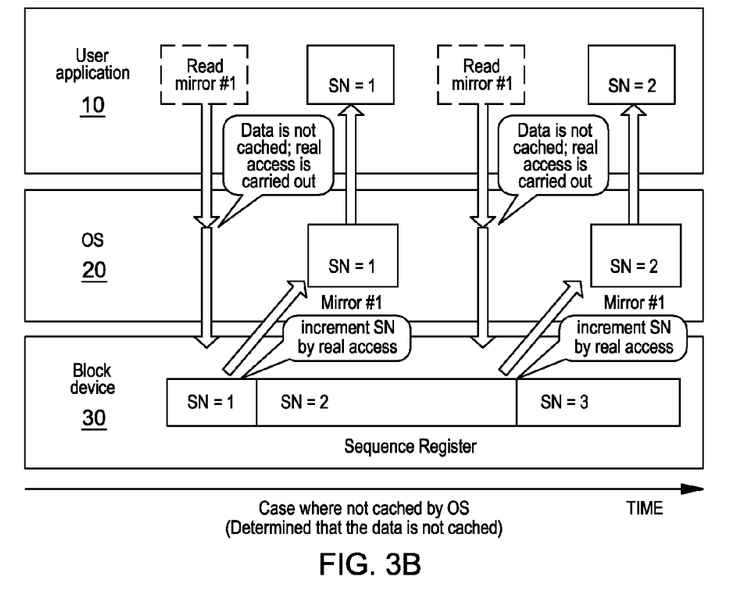

FIG. 3 illustrates in further detail the function of the sequence number (SN).

The sequence number changes value (increases) each time an actual file access is generated in the block device 30. By using a sequence number, the user application 10 can determine whether or not a file has been cached by the OS 20.

FIG. 3 is an example showing how the sequence number changes based on the presence of a file cache in the OS 20, for the case where a file is accessed two times by the user application 10.

The figure on the left side of FIG. 3 illustrates the action when a file is cached by the OS 20. When an initial access is generated by the user application, the request reaches the OS, and the OS determines whether or not there is cache at that moment.

As illustrated in the diagram on the left side of FIG. 3, there is no cache in the OS 24 the initial access, so actual access is generated for the block device 30. The block device 30 detects file access, increases the value of the sequence number, accesses the data of the initial subject file stored in the memory of the block device 30, and returns the data to the OS 20. At this time, the SN is added (to the end or the like) of the data. The OS 20 returns the received data to the user application, and thus the initial file access is completed.

Next, when file access for the same file is performed a second time, the OS 20 will have cache, so the OS 20 returns the cached content to the user application 10. Therefore, actual access to the block device 30 will not occur, and thus the second file access is completed.

Therefore, the user application 10 side compares the value of the SN that has been added to the (end) of the data obtained initially and after accessing a second time. The value of the SN is identical, so the user application can determine that the second data is cache, and that the second data is old data (cache) that was not actually access to the block device.

The diagram on the right side of FIG. 3 illustrates the case where the OS 20 does not have cache. With the initial file access, the OS 20 generated an actual access to the block device 30 because there was no cache, and the SN value was increased in the block device 30, and that value is added to the (end or the like) of the data for the file and returned. Even if a second file access is generated, the OS 20 will not cache, so the actual access to the block device 30 is regenerated, the SN is similarly added in the block device 30, and that value is attached to (the end or the like) of the data of the file and returned.

When the end of the data obtained by the first and second access are compared by the user application 10, there is no cache from the OS 20, so the second time data can be determined to be the latest data that was actually accessed to the block device 30, similar to the first time.

Figure 4:
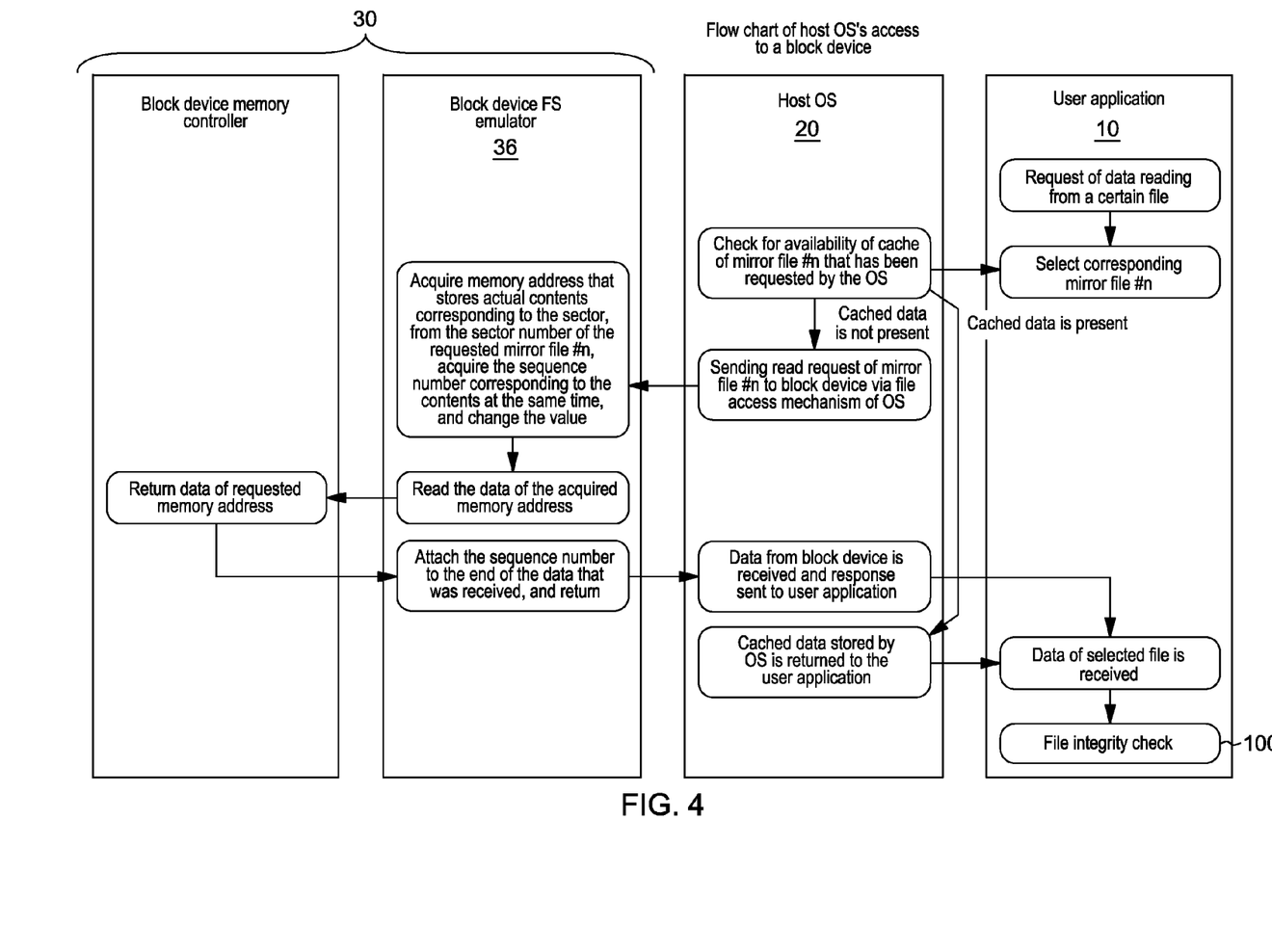
FIG. 4 illustrates the flow of the file system emulator and memory functions in the user application 10, host OS 20, and block device 30.

FIG. 4 illustrates the flow of the file to an emulator and memory in the user application 10, host OS 20, and block device 30.

Figure 5:
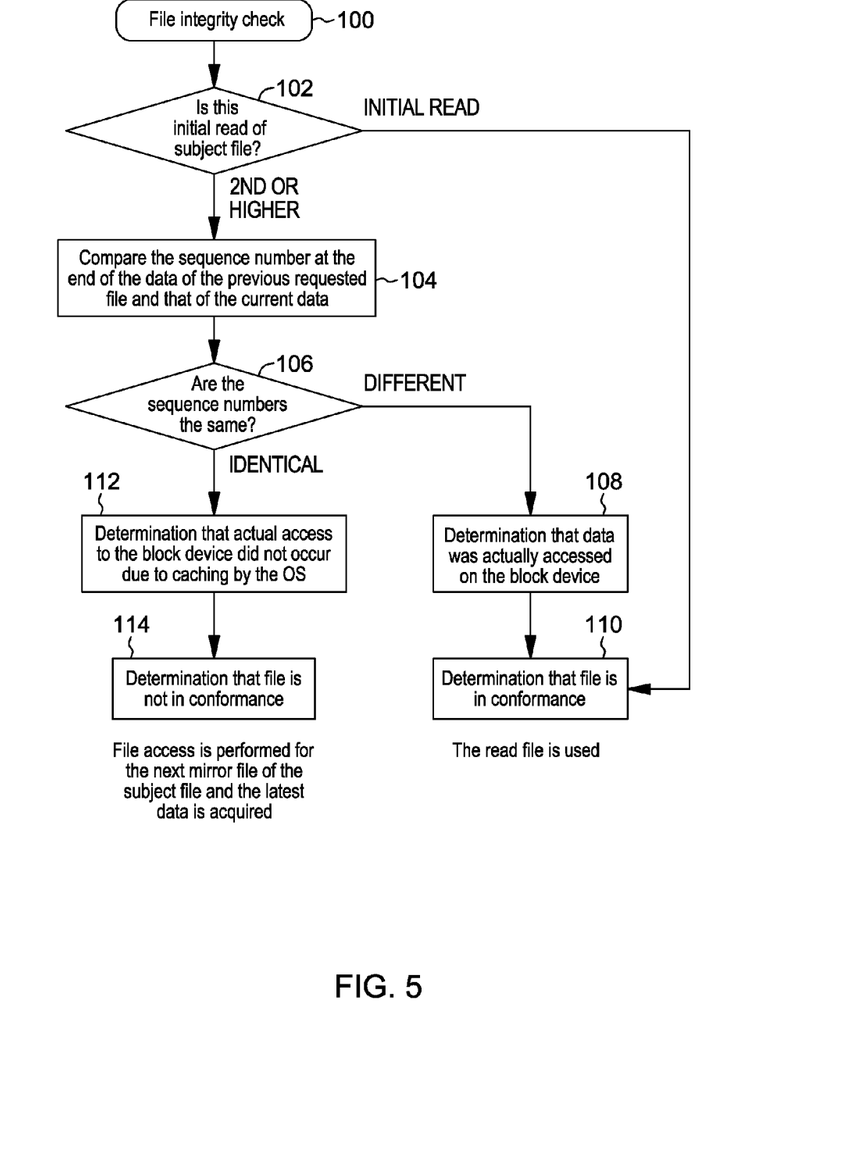
FIG. 5 illustrates the flow of a file integrity checking part for checking the presence of cache.

FIG. 5 illustrates the flow of a file integrity checking part for checking the presence of cache.

FIG. 6 illustrates the configuration of the content table and the mirror file entry table (MFET).

When the user application 10 accesses a file through the standard file I/O 22 of the OS 20, the file system emulator 36 on the block device 30 side refers to the mirror file entry table (MFET) 37 in order to make a determination about the mirror file (refer to FIG. 1).

Figure 6A:
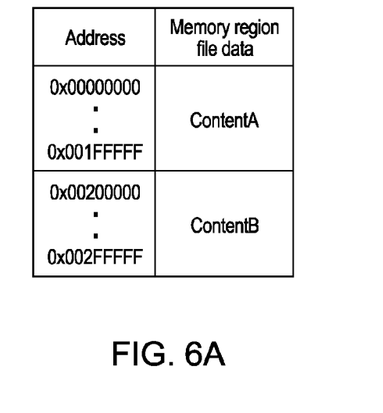
FIG. 6 illustrates the configuration of the content table and the mirror file entry table (MFET).

With regards to the contents that were downloaded by the wireless receiver 31 in the block device 30, which address range the contents are stored in is recorded using the contents table shown in FIG. 6(a).

Figure 6B:
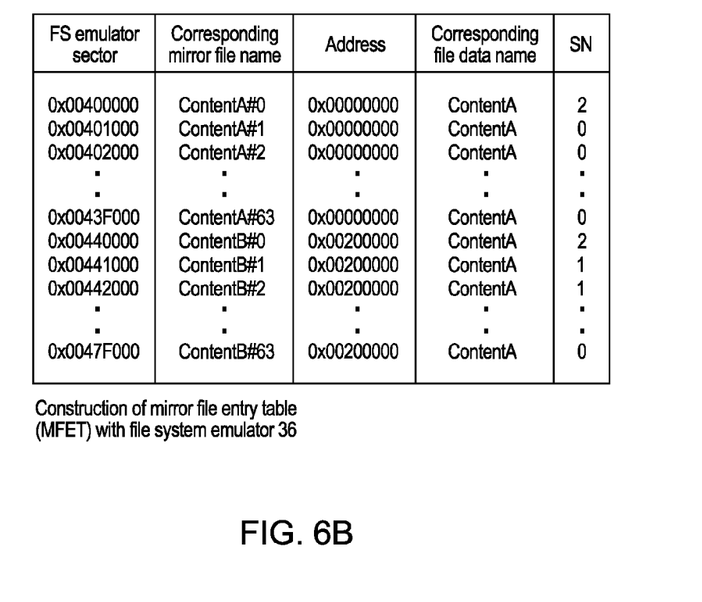

FIG. 6(b) is a mirror file entry table (MFET) that controls the mirror file information, and controls the sequence number (SN) and the Association between the mirror file and the memory address where the contents are stored.

When content is downloaded, a plurality of mirror files (64 in the example shown in the drawing) are created on the file system, and the sector at the time each mirror file is referred to by the OS 20 is determined for each mirror file.

The sector number is recorded in the sector portion of the first column of the MFET.

The second column is shown until the filename of the corresponding mirror file is referenced on the file system, but the information for the filename is not necessarily recorded by the MFET itself. (The filename and the sector mapping are for recording on the file system main body portion referenced by the OS, as is conventional).

The third column stores the address in the memory that the actual contents corresponding to the mirror file are recorded in.

The fourth column shows the filename of the corresponding actual contents as a reference, but there is no need for the MFET itself to store this. (This mapping is to enable a determination by the referencing the content table in FIG. 6(a)).

Furthermore, records the sequence number (SN).

The determination as to whether or not the file that was accessed via the OS 20 is a mirror file can be performed by checking whether or not the sector number of the file that was accessed matches the sector of the first column of the MFET, and if the sectors match, it can be determined that the file is a mirror file.

After it is determined that the file is a mirror file, by performing file access on a memory address in the block device 30 that is shown in the third column of the MFET, access from a plurality of mirror files can be performed on the latest content that are stored in memory in the block device 30, of which there is actually only one. There is provided with a computer program product for performing a file request access by a user application towards a host operating system (OS) the computer program product comprising a tangible storage device readable by a processing circuit and storing instructions run by the processing circuit for performing the method(s) described in the present disclosure.

DESCRIPTION OF SYMBOLS 10 user application
20 host OS
30 block device
36 file system emulator
37 mirror file entry table (MFET)

What is claimed is:

1. A method of performing a file request access by a user application running on a host operating system (OS) of a programmed computing device, comprising:
   receiving at the host OS, from the user application, a sequence number corresponding to the requested file;
   determining, by the host OS, whether the requested file is a mirror file, the determining including:
      identifying a sector number of the requested file;
      accessing a mirror file entry table (MFET) whose entries list a sector number of each mirror file and an address of the each mirror file;
      comparing the identified sector number of the requested file with sector numbers listed in the mirror file entry table;
      upon finding a match between the identified sector number and a sector number listed in the mirror file entry table, determining that the requested file is the mirror file, each mirror file being a different file but accessed via a same physical memory address; and
      otherwise, determining that the requested file is not the mirror file;
   determining by the host OS whether or not the data associated with the sequence number that was received is cached in the host OS, the data including the requested file;
   requesting, by the host OS, to read the data associated with the sequence number to a block device if the host OS determines that the data associated with the sequence number that was received is not cached in the host OS;
   acquiring, by the block device, a memory address where the data corresponding to a sector number of the sequence number is stored and changing the sequence number;
   reading, by the block device, the data stored in the acquired memory address;
   the block device converting the data that was read to data with the changed sequence number attached, and providing the data to the host OS;
   providing, by the host OS, the data provided from the block device to the user application; and
   providing, by the host OS, the user application with data for the user application that has been cached in the host OS, if it is determined that the data associated with the sequence number that was received is cached in the host OS.

2. The method according to claim 1, further comprising:
   comparing a sequence number of a previous file request access with the sequence number of the requested file;
   determining that data cached in the host OS will be provided if the comparison results show that the sequence numbers are same; and
   determining that the data read from the block device will be provided if the comparison results show that the sequence numbers are different.

3. The method according to claim 2, further comprising:
   transmitting the changed sequence number to the host OS if it is determined that the data that has been cached in the host OS has been provided.

4. The method according to claim 1, further comprising:
adding the changed sequence number to an end of the data.

5. A system comprising:
a memory storage device;
a computer device running a host operating system (OS), said device in communication with the memory storage device and a block device, said computer device programmed with instructions of a user application to perform a method requesting a file access, said method comprising:
receiving at the host OS, from the user application, a sequence number corresponding to the requested file;
determining, by the host OS, whether the requested file is a mirror file, the determining including:
identifying a sector number of the requested file;
accessing a mirror file entry table (MFET) whose entries list a sector number of each mirror file and an address of the each mirror file;
comparing the identified sector number of the requested file with sector numbers listed in the mirror file entry table;
upon finding a match between the identified sector number and a sector number listed in the mirror file entry table, determining that the requested file is the mirror file, each mirror file being a different file but having a same physical memory address; and
otherwise, determining that the requested file is not the mirror file;
determining by the host OS whether or not data of the sequence number that was received is cached in the host OS;
requesting, by the host OS, to read the data of the sequence number to a block device if the host OS determines that the data of the sequence number that was received is not cached in the host OS;
acquiring, by the block device, a memory address where the data are stored corresponding to a sector number of the sequence number and changing the sequence number;
reading, by the block device, the data of the acquired memory address;
the block device converting the data that was read to data with the changed sequence number attached, and providing the converted data to the host OS;
providing, by the host OS, the data provided from the block device to the user application; and
providing, by the host OS, the user application with data for the host application that has been cached in the host OS, if it is determined that the data of the sequence number that was received is cached in the host OS.

6. A method of responding to a read request for data based on a sequence number received from a user application via a host operating system (OS), comprising:
determining, by the host OS, whether a requested file is a mirror file, the determining including:
identifying a sector number of the requested file;
accessing a mirror file entry table (MFET) whose entries list a sector number of each mirror file and an address of the each mirror file;
comparing the identified sector number of the requested file with sector numbers listed in the mirror file entry table;
upon finding a match between the identified sector number and a sector number listed in the mirror file entry table, determining that the requested file is the mirror file, each mirror file being a different file but accessed via a same physical memory address; and
otherwise, determining that the requested file is not the mirror file;
acquiring, by a block device, a memory address where data corresponding to a sector number of the received sequence number is stored, the stored data including the requested file and changing the received sequence number;
reading, by the block device, the data of the acquired memory address; and
converting, by the block device, the data that was read to data with the changed sequence number attached, and providing the converted data to the host OS.

7. A file system comprising:
a memory storage device;
a computer device running a host operating system (OS), said computer device in communication with the memory storage device and a block device, said computer device programmed with instructions of a user application to perform a method requesting a file, said method comprising:
responding, by said block device, to a read request for data based on a sequence number received from said user application via the host operating system (OS), wherein said responding comprises:
determining, by the host OS, whether the requested file is a mirror file, the determining including:
identifying a sector number of the requested file;
accessing a mirror file entry table (MFET) whose entries list a sector number of each mirror file and an address of the each mirror file;
comparing the identified sector number of the requested file with sector numbers listed in the mirror file entry table;
upon finding a match between the identified sector number and a sector number listed in the mirror file entry table, determining that the requested file is the mirror file, each mirror file being a different file but accessed via a same physical memory address; and
otherwise, determining that the requested file is not the mirror file;
acquiring a memory address where corresponding to a sector number the received sequence number is stored, the stored data including the requested file and changing the received sequence number;
reading the data of the acquired memory address;
converting the data that was read to data with the changed sequence number attached, and
providing the converted data to the host OS.

8. A system comprising:
a memory storage device;
a computer device running a host operating system (OS), said computer device in communication with the memory storage device and a block device, said computer device programmed with instructions of a user application to perform a method requesting a file read access, said method further comprising:
providing, in said block device, a mirror file entry table (MFET) for responding to said read request for data based on a sequence number received from said user application via said host OS;
determining, by the host OS, whether the requested file is a mirror file, the determining including:
identifying a sector number of the requested file;
accessing a mirror file entry table (MFET) whose entries list a sector number of each mirror file and an address of the each mirror file;

comparing the identified sector number of the requested file with sector numbers listed in the mirror file entry table;
upon finding a match between the identified sector number and a sector number listed in the mirror file entry table, determining that the requested file is the mirror file, each mirror file being a different file but accessed via a same physical memory address; and
otherwise, determining that the requested file is not the mirror file;
acquiring, from said MFET, a memory address where data corresponding to a sector number of the received sequence number is stored, the stored data including the requested file; and
enabling handling of the sector number of the requested file and the acquired memory address where the data corresponding to the sector number of the received sequence number is stored in the block device, and
enabling revising of the received sequence number by a file system emulator each time there is a data read request.

9. The system as claimed in claim 8, wherein the method for performing the requested file read access further comprises:
determining, by the host operating system (OS) whether or not the data of the sequence number that was received is cached in the host OS, for the sequence number received from an external device and corresponding to the requested file;
requesting, by the host OS, reading the data of the sequence number to the block device if the host OS determines that the data of the sequence number that was received is not cached in the host OS;
acquiring, by the block device, a memory address where the data is stored and changing the received sequence number;
reading, by the block device, the data of the acquired memory address;
converting, by the block device, the data that was read to data with the changed sequence number attached, and providing the converted data to the host OS;
providing, by the host OS, the converted data to the user application; and
providing, by the host OS, to the memory storage device, data for the host application that has been cached in the host OS, if it is determined that the data of the received sequence number is cached in the host OS.

10. A computer program product for performing a file request access by a user application towards a host operating system (OS) the computer program product comprising a non-transitory tangible storage device readable by a processing circuit and storing instructions run by the processing circuit for performing a method, the method comprising:
receiving at the host OS, from the user application, a sequence number corresponding to the requested file to the host OS;
determining, by the host OS, whether the requested file is a mirror file, the determining including:
identifying a sector number of the requested file;
accessing a mirror file entry table (MFET) whose entries list a sector number of each mirror file and an address of the each mirror file;
comparing the identified sector number of the requested file with sector numbers listed in the mirror file entry table;
upon finding a match between the identified sector number and a sector number listed in the mirror file entry table, determining that the requested file is the mirror file, each mirror file being a different file but accessed via a same physical memory address; and
otherwise, determining that the requested file is not the mirror file;
determining, by the host OS, whether or not data associated with the sequence number that was received is cached in the host OS, the data including the requested file;
requesting, by the host OS, reading the data associated with the received sequence number to a block device if the host OS determines that the data associated with the sequence number that was received is not cached in the host OS;
acquiring, by the block device, a memory address where the data corresponding to a sector number of the received sequence number is the stored and changing the received sequence number;
reading, by the block device, the data stored in the acquired memory address;
converting, by the block device, the data that was read to data with the received sequence number attached, and providing the converted data to the host OS;
providing, by the host OS, the converted data provided from the block device to the user application; and
providing, by the host OS, the user application with data for the host application that has been cached in the host OS, if it is determined that the data of the received sequence number is cached in the host OS.

11. A method of accessing data comprising:
responding to a file request for data based on a sequence number transmitted from an external device via a host operating system (OS), comprising:
determining, by the host OS, whether a requested file is a mirror file, the determining including:
identifying a sector number of the requested file;
accessing a mirror file entry table (MFET) whose entries list a sector number of each mirror file and an address of the each mirror file;
comparing the identified sector number of the requested file with sector numbers listed in the mirror file entry table;
upon finding a match between the identified sector number and a sector number listed in the mirror file entry table, determining that the requested file is the mirror file, each mirror file being a different file but accessed via a same physical memory address; and
otherwise, determining that the requested file is not the mirror file;
acquiring, by a block device, a memory address associated with the requested file received sequence number;
reading, by the block device, the data of the acquired memory address; and
converting, by the block device, the data that was read to data with the changed sequence number attached, and providing the converted data to the host OS.

12. A computer program product for responding to a read request for data based on a sequence number transmitted from an external device via a host operating system (OS), the computer program product comprising a non-transitory tangible storage device readable by a processing circuit and storing instructions run by the processing circuit for performing a method, the method comprising:
receiving, at the host OS, a request of a file;
determining, by the host OS, whether a requested file is a mirror file, the determining including:
identifying a sector number of the requested file;

accessing a mirror file entry table (MFET) whose entries list a sector number of each mirror file and an address of the each mirror file;

comparing the identified sector number of the requested file with sector numbers listed in the mirror file entry table;

upon finding a match between the identified sector number and a sector number listed in the mirror file entry table, determining that the requested file is the mirror file, each mirror file being a different file but accessed via a same physical memory address;

otherwise, determining that the requested file is not the mirror file;

acquiring, by a block device, a memory address associated with the requested file transmitted sequence number;

reading, by the block device, the data of the acquired memory address; and converting, by the block device, the data that was read to data with the changed sequence number attached, and providing the converted data to the host OS.

* * * * *